United States Patent Office 2,711,505
Patented June 21, 1955

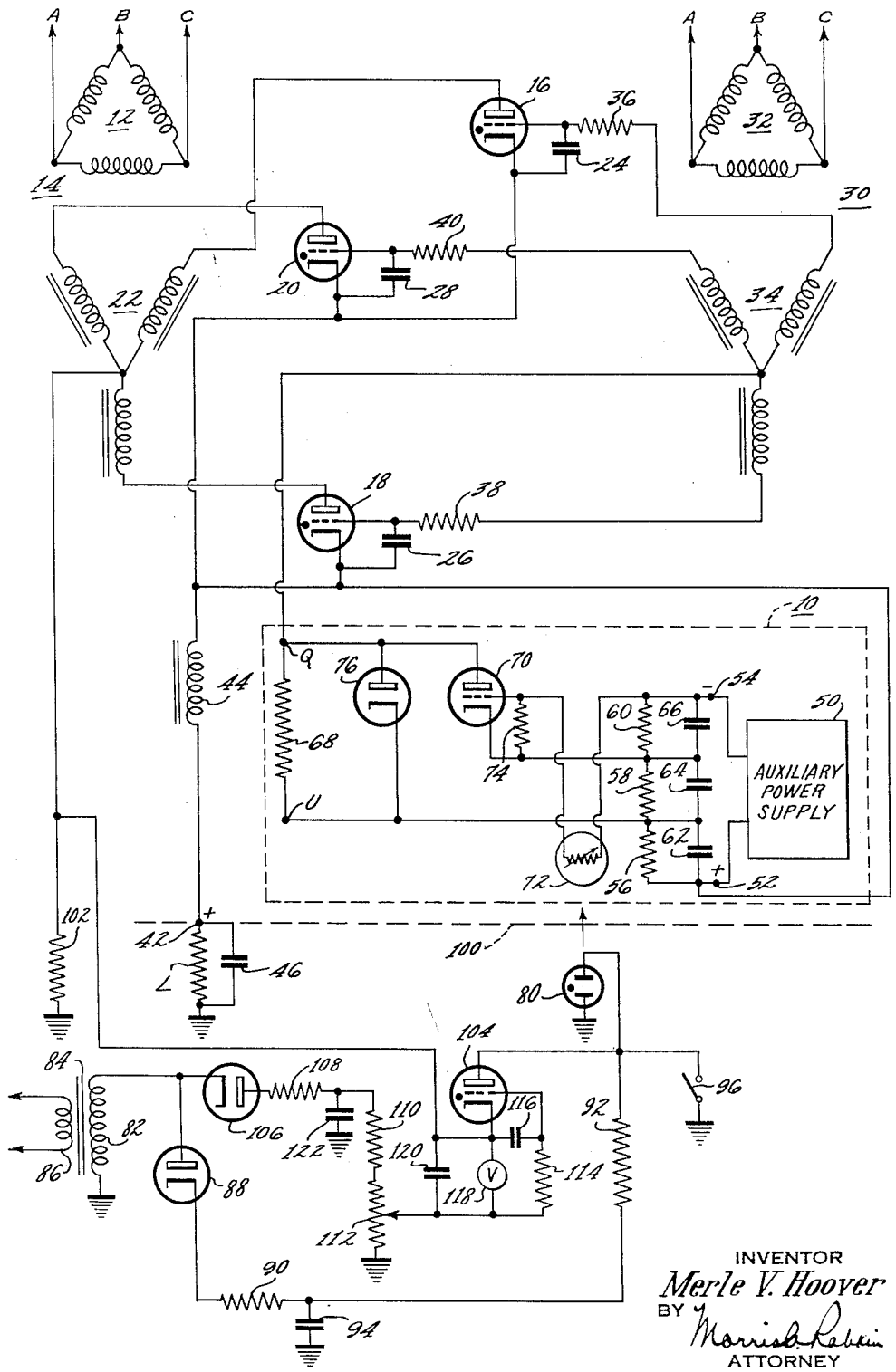

2,711,505

RECTIFIER CONTROL SYSTEM

Merle V. Hoover, Mountville, Pa., assignor to Radio Corporation of America, a corporation of Delaware Application April 30, 1952, Serial No. 285,207

11 Claims. (Cl. 321—13)

This invention relates, in general, to rectifier control systems. More particularly, the invention relates to rectifier blocking control systems wherein photoelectric signalling is employed to transmit information from ground to the high voltage bus of a grid controlled rectifier system. While not specifically limited thereto, the blocking control systems of this invention are particularly applicable to grid controlled rectifier systems having a relatively high output and provided with high speed fault protection means.

As is well known in the art, grid controlled rectifier systems employing gaseous conduction devices such as thyratrons and ignitrons, for example, are used to provide a relatively high unidirectional voltage output. The high cost and circuit complexity of these rectifier systems, however, have been the chief deterrents against their greater popularity. Since the cathodes of these gaseous conduction devices operate at a positive D.-C. voltage with respect to ground, it is necessary that the control circuits of these devices operate with respect to their cathodes as a neutral. Consequently, it is necessary to provide some sort of signal power link between ground and the positive D.-C. bus of the rectifier system. Obviously, an insulation problem exists if the rectifier is to operate at a relatively high D.-C. voltage output, say 20 kv. Using a safety factor of 2½, the blocking control circuits would have to be insulated by at least 50 kv. insulation. Since the operator of the rectifier system is normally at ground potential, it is necessary to provide some means of transmitting intelligence from ground potential to the high voltage bus in order to block or unblock the rectifier system. In the prior art systems, this has been accomplished by insulated mechanical linkages or by means of insulated impulse transformers. The insulated mechanical linkages, however, are unsatisfactory for high speed operation as a consequence of their inherent mechanical inertia. Insulated impulse transformers are unsatisfactory also because they are bulky, expensive, and exhibit electrical inertia or inductance which limits their frequency response.

It is accordingly a principal object of the present invention to provide an improved blocking control system for grid controlled rectifier systems which will be free from the aforementioned disadvantages.

It is a further object of this invention to provide an improved blocking control system, for grid controlled rectifier systems, which is substantially free from mechanical and electrical inertia.

Another object of this invention is to provide an improved rectifier blocking control system for grid controlled rectifier systems, which transmits intelligence from ground to the high voltage bus of the rectifier systems without employing expensive insulated transformers.

Still another object of this invention is to provide a rectifier blocking control system for grid controlled rectifier systems, which uses inexpensive conventional components, is "fail-safe," and lends itself to high speed fault protection of a load on the rectifier system.

According to the invention, these and other objects and advantages are attained in a novel and highly efficient blocking control system for a rectifier system employing grid controlled gaseous conductive devices, as for example, thyratrons or ignitrons. Under normal operating conditions, the grids of the gaseous conductive devices, as for example, the thyratrons, are biased by a negative voltage applied from an auxiliary power supply. The thyratrons are fired cyclically by means of a positive voltage, of a magnitude greater than the normal biasing voltage, supplied from an impulse transformer. The magnitude of the bias, the negative voltage between the grid and the cathode of the thyratron, is controlled by a photoelectric cell in circuit with the auxiliary power supply, a control tube, and the impulse transformer. When it is desired to operate the rectifier system, that is, to unblock the rectifier, light is permitted to fall upon the photoelectric cell. Current flowing through the photoelectric cell biases the control tube to cut-off and permits a relatively low negative voltage to be applied to the grids of the thyratrons. Under these conditions, the positive voltage pulses from the impulse transformer are sufficient to overcome the low negative voltage from the auxiliary power supply, and the thyratrons will be fired cyclically. When it is desired to block the rectifier system, that is, to turn it off, the light falling on the photoelectric cell is extinguished. Under the latter conditions, the bias is removed from the control tube whereby it becomes conductive and produces a relatively high negative going voltage at its anode, as a consequence of a load resistor in its anode circuit. The high negative going voltage is applied to the grids of the thyratrons and is greater in magnitude than the positive voltage pulses from the impulse transformer. The thyratrons are, therefore, biased to cut-off and the rectifier is blocked. The rectifier blocking control system also provides means to turn the light on and off manually, or off automatically in response to a fault, such as a short circuit, in the load circuit.

A more complete understanding of the invention may be had from the following description when read in connection with the accompanying drawing of which the single figure is a schematic circuit diagram of an illustrative embodiment thereof.

Referring to the drawing, there is shown a three phase, half-wave rectifier system comprising a blocking control system 10 in accordance with the invention and included within the dashed rectangle. Three phase power ABC from a suitable source (not shown) is applied to the delta-connected primary 12 of a transformer 14. Transformed three phase power is applied to the anodes of gaseous conduction devices or tubes 16, 18 and 20 by the secondary legs of the Y-connected secondary 22 of the transformer 14. The gaseous conduction tubes 16, 18 and 20 may be thyratrons, as illustrated, or ignitrons. Capacitors 24, 26 and 28 are connected between the cathode and the grid of each of the tubes 16, 18 and 20, respectively, in order to stabilize the spurious conduction characteristics of these tubes. In order to cyclically fire the tubes 16, 18 and 20, there is provided an impulse transformer 30. Three phase power ABC, preferably from the same source (not shown) as the three phase power ABC applied to the delta-connected primary 12 of the transformer 14, or in phase therewith, is applied to the delta-connected primary 32 of the impulse transformer 30. Each of the secondary legs of the Y-connected secondary 34 of the impulse transformer 30 is connected to the grid of a separate one of the tubes 16, 18 and 20 through resistors 36, 38 and 40, respectively. The resistors 36, 38 and 40 serve to limit the peak grid currents when the grids of the tubes 16, 18 and 20 are driven positive in order to establish the conduction of current through these tubes, as when they are fired. The cathodes of the tubes 16, 18 and 20 are connected to each other and to a positive output terminal 42 through a filter inductance 44. A load L, illustrated as a resistor, is connected between the positive output terminal 42 and ground. A filter capacitor 46 is also connected between the positive output terminal 42 and ground.

The rectifier blocking control system 10 will now be described. The purpose of the rectifier blocking control system 10 is to provide "on-off" control for the rectifier circuit. This is accomplished by applying a relatively small negative voltage to the grids of the tubes 16, 18 and 20 with respect to their cathodes, to unblock them, and a relatively greater negative voltage to these grids to block them. The rectifier blocking control system comprises an auxiliary, unidirectional power supply 50 having a positive output terminal 52 and a negative output terminal 54. A voltage divider comprising the resistors 56, 58 and 60, connected in series with each other, is connected across the output terminals 52, 54 of the auxiliary power supply 50. Filter capacitors 62, 64 and 66 are connected across the resistors 56, 58 and 60, respectively. The positive terminal 52 of the auxiliary power supply 50 is connected also to the cathodes of the tubes 16, 18 and 20. The neutral of the Y-connected secondary 34 of the impulse transformer 30 is connected to the junction between the resistors 56, 58 through a resistor 68 for the purpose appearing hereinafter.

Under normal operating conditions, the bias, or the negative voltage between the grid and the cathode of each of the tubes 16, 18 and 20, supplied by the voltage drop across the resistor 56, is not sufficient in magnitude to overcome the positive voltage pulses supplied by the secondary legs of the Y-connected secondary 34 of the impulse transformer 30. For instance, if the voltage across the resistor 56 is about −20 volts and the positive voltage pulses supplied by each of the secondary legs of the Y-connected secondary 34 is 40 volts, it will be understood that the tubes 16, 18 and 20 will be fired cyclically in accordance with the positive voltage pulses from the impulse transformer 30.

In order to block the rectifier system, that is, to stop the cyclical conduction of the tubes 16, 18 and 20, the blocking control system must apply a negative voltage great enough to overcome the positive voltage pulses produced by the Y-connected secondary 34 of the impulse transformer 30. To this end, there is provided a control tube 70 having an anode connected to the neutral of the Y-connected secondary 34 of the transformer 30, and a cathode connected to the junction of the resistors 58, 60. The control grid of the tube 70 is connected to the negative terminal 54 of the auxiliary power supply 50 through a photoelectric cell 72. The photoelectric cell 72 is of the type which provides a very high impedance to the flow of an electric current when no light is falling upon it, and a very low impedance when it is activated by a beam of light. A bias resistor 74 is connected between the grid and the cathode of the control tube 70.

In order to prevent spurious conduction, due to "bootstrapping," in a grid controlled rectifier of the type described, a half-wave rectifier device or diode 76 is connected across the resistor 68. The anode of the diode 76 is connected to a point Q between the neutral of the secondary 34 of the transformer 30 and the resistor 68, and the cathode of the diode 76 is connected to a point U between the resistor 68 and the junction between the resistors 56, 58. By "bootstrapping," as the term is used herein, is meant the phenomenon wherein a positive voltage on the grid of one of the thyratrons in the rectifier system, when the rectifier system is first unblocked, is fed back to the grid of the next thyratron to be fired, so that the latter thyratron will fire prematurely. The feed back voltage results from the cathode of the thyratron going positive, and the interelectrode capacitance and the capacitance coupling between the cathode and the grid. The rectifier 76, as connected, serves to decouple the tubes 16, 18 and 20 and thereby prevents faulty operation of the rectifier system resulting from "bootstrapping." For example, let it be assumed that the rectifier system is unblocked and the tube 16 is the first to be fired. The cathode of the tube 16 rises from zero potential to a high positive potential. As a consequence of the interelectrode capacitance of the tube 16, and the capacitor 24, the grid of the tube 16 has impressed upon it a high positive potential. This high positive potential is fed back to the point Q through the resistor 36, and the secondary 34 of the transformer 30. Under these conditions, the anode of the rectifier 76 is more positive than its cathode, and the rectifier 76 becomes a very low impedance across the resistor 68 and prevents the point Q from becoming more positive than the point U. It is noted that, for normal operation, the point U must be more positive than the point Q. Unless the voltage fed back from the grid of the tube 16 is dissipated, as by the rectifier 76, it may prematurely fire the tube 18, the next tube to be fire cyclically, and thus cause faulty operation of, and possible damage to, the rectifier system. It is obvious to those skilled in the art that the rectifier 76 may take the form of a hot-cathode device, a cold-cathode device, or a selenium or germanium diode, depending on the voltages, speed of reaction, and other design characteristics required.

In order to control the impedance of the photoelectric cell 72 and thereby the bias of the control tube 70, there is provided a light source 80 positioned directly opposite the photoelectric cell 72. The light source 80 should be preferably a device in which the build-up and the decay characteristics are substantially instantaneous. Neon or argon gaseous tubes, glow discharge modulator tubes similar to those employed in facsimile systems, or fluorescent screen light sources, such as the kinescope or oscillograph tubes are suitable for the light source 80. Incandescent lights or other types of light sources with inherent, appreciable build-up or decay characteristics are not generally considered satisfactory because they delay the speed of response.

The light source 80 is illuminated from power derived from the secondary 82 of a transformer 84. The primary 86 of the transformer 84 may be applied to any suitable source of alternating current (not shown). One end of the secondary 82 is grounded and the other end is connected to the anode of a diode rectifier 88. The cathode of the rectifier 88 is connected to one of the terminals of the light source 80 through a filter resistor 90 and a resistor 92 in series therewith. A second terminal of the light source 80 is grounded. The unidirectional voltage from the rectifier 88 is filtered further through a filter capacitor 94 connected between the resistors 90, 92 and ground. The junction between the resistor 92 and the light source 80 is connected to ground through a switch 96. It will now be understood that the light source 80 may be lighted by a filtered, unidirectional voltage thereacross when the switch 96 is open. In order to extinguish the light source 80, switch 96 is closed.

The operation of the rectifier blocking control system will now be described. In order to unblock the rectifier system, the switch 96 is opened. Alternating current applied across the primary 86 of the transformer 84 is transformed in the secondary 82 and rectified by the rectifier 88. The unidirectional voltage is filtered by the filter resistor 90 and capacitor 94, and applied to the light source 80 through the current limiting resistor 92. When a beam of light from the light source 80 impinges upon the photoelectric cell 72, the latter becomes conductive. The voltage across the resistor 60 will then cause current to flow through the resistor 74 and bias the control tube 70 to cut-off. Under these conditions, no current will flow in the anode-cathode circuit of the control tube 70 and the voltage applied between the neutral of the Y-connected secondary 34 of the impulse transformer 30 and the cathodes of the tubes 16, 18 and 20 will be the relatively small negative voltage across the resistor 56. This latter, negative voltage, the normal operating bias for the tubes 16, 18 and 20, may be overcome by the positive voltage pulses produced in the secondary 34 of the impulse transformer 30 to cyclically fire the tubes 16, 18 and 20. Under these conditions, the rectifier system is unblocked.

In order to block the rectifier system, the light source 80 is extinguished by closing the switch 96. In the absence of light, the photoelectric cell 72 becomes a substantially infinite impedance, thereby removing the bias on the control tube 70 so that the latter will now operate under substantially zero bias. Under the latter condition, current will flow in the anode-cathode circuit of the control tube 70 to produce a drop in voltage across the load resistor 68 in the anode-cathode circuit of the control tube 70. The latter, negative going voltage is now of such a magnitude that it cannot be overcome by the positive voltage impulses produced in the Y-connected secondary 34 of the impulse transformer 30, and consequently the tubes 16, 18 and 20 will cease firing. Thus, it is seen that there is provided, in accordance with the objects of this invention, a rectifier blocking control system employing photoelectric signalling means to block and unblock a grid controlled rectifier system. The portion of the rectifier circuit, including the blocking control circuit above the dashed line 100, must be insulated for very high voltage, whereas the portion of the circuit below the dashed line 100, the portion handled by the operator, is operated at a substantially safe operating voltage.

Means are provided to block the rectifier system automatically in response to a fault in the load circuit of the rectifier system. Since a rectifier system of the type described may be used to furnish a very high unidirectional voltage to a load, such as a high power vacuum tube, a fault in the form of a short, or a flashover, for example, in the tube may completely ruin the tube if the rectifier is not blocked immediately. To this end, a high speed fault protection circuit is provided which will automatically extinguish the light 80 when a fault develops, and thereby block the rectifier system. As part of the fault protection circuit, the neutral of the Y-connected secondary 22 of the transformer 14 is connected to ground through a resistor 102 and to the cathode of a control tube or thyratron 104. The anode of the thyratron 104 is connected to the junction between the resistor 92 and the light source 80. Grid bias for the thyratron 104 is furnished by a diode rectifier 106 having a cathode connected to the anode of the rectifier 88, and an anode connected to ground through a filter resistor 108 in series with a resistor 110 and a potentiometer 112. The grid of the thyratron 104 is connected to the movable tap of the potentiometer 112 through a resistor 114. A capacitor 116 is connected between the cathode and the grid of the thyratron 104 in order to minimize spurious conduction, in the conventional manner. A voltmeter 118 may be connected between the cathode of the thyratron 104 and the movable arm of the potentiometer 112 for the purpose of determining the proper grid bias for the thyratron 104. A by-pass capacitor 120 is connected across the voltmeter 118. The bias voltage applied to the thyratron 104 may be further filtered by a filter capacitor 122 connected between the junction of the resistor 108, 110 and ground.

The operation of the high speed fault protection circuit is as follows: In the event of a fault, that is a short in the load L, the current drawn from the rectifier system will greatly increase. This increased current must flow back to the neutral of the Y-connected secondary 22 of the transformer 14 through the negative return resistor 102, thereby producing an increasingly negative voltage across the resistor 102 with respect to ground. This increasingly negative voltage is applied to the cathode of the thyratron 104. It is understood that driving the cathode of the thyratron 104 in a negative direction renders the thyratron 104 conductive, since the effect is similar to that of driving the grid of the thyratron more positive. Anode voltage for the thyratron 104 is supplied by the half wave rectifier 88 operating in conjunction with the filter resistor 90 and capacitor 94. The resistor 92 serves the combined function of a plate resistor for the thyratron 104 and a series limiting resistor for the light source 80. Fixed grid bias for the thyratron 104 is supplied by the half wave diode rectifier 106 operating in conjunction with the filter resistor 108 and the capacitor 122. The resistor 110 and potentiometer 112 serve as a voltage divider, the latter being variable for the purpose of adjusting the conduction bias sensitivity of the thyratron 104, as observed on the voltmeter 118. Therefore, any substantial increase in current flowing through the rectifier system will trigger the thyratron 104 and thereby produce a drop in voltage at the anode of the thyratron 104 as a consequence of the plate load resistor 92. This latter drop in voltage is sufficient to extinguish the light source 80 and thereby block the rectifier system. It will be noted that the light source 80 is connected in shunt with the thyratron 104. When the fault in the load L has been corrected, the rectifier system may be restored to operation by momentarily closing the switch 96 in order to divert the conduction of the thyratron 104 until the grid of the thyratron 104 is able to regain hold-off control. When the manually operated switch 96 is again opened, the light source 80 will light and the rectifier will be unblocked in the manner described.

It is apparent to those skilled in the art that there are certain applications where it would be desirable to replace the thyratron 104 with a vacuum tube conduction device (for example, a triode) in order to restore automatic operation without resorting to the operation of the manual switch 96. Thus, in the event of a fault in the load L, the increased current flow through the resistor 102 will develop a negative going voltage in the cathode circuit of the vacuum tube with the consequence that the vacuum tube will draw plate current and shunt the light source 80 as a means of blocking the rectifier system. This latter type of circuitry is particularly applicable to loads exhibiting transient faults. Those skilled in the art could also envision methods by which the manually operated switch 96 could be replaced by automatic relay means. The fault protection system is substantially "fail safe" in operation. If the light source 80, the rectifiers 88, 106 and/or associated components should fail, the rectifier will be automatically blocked until suitable repairs can be effected.

Although the rectifier blocking control systems described herein have been described in connection with a three phase, half wave, grid controlled rectifier system, they are applicable to substantially all other forms of grid controlled rectifier systems; and it should be understood that the invention is not limited to the particular embodiment above-described and disclosed, but that changes and modifications may be made within the spirit of the invention.

What is claimed is:

1. The combination with a rectifier system comprising a plurality of grid controlled gaseous conduction tubes, a light source, and means to light and extinguish said light source, of a rectifier blocking control system comprising means responsive to said light source to unblock said rectifier system when said light source is lighted and to block said rectifier system when said light source is extinguished, said last-mentioned means comprising a source of unidirectional voltage, a control tube having an anode, a control grid, and a cathode, a photoelectric cell connected between said voltage source and said last-mentioned control grid, a resistor between said last-mentioned control grid and said cathode, a load resistor between said anode and said voltage source, and connection means between said anode and the grids of said gaseous conduction tubes.

2. The combination as defined in claim 1 wherein said light source has substantially instantaneous build-up and decay characteristics.

3. The combination as defined in claim 1 wherein said means to light and extinguish said light source comprises means to apply a source of unidirectional voltage across said light source, and a switch in shunt with said light source and said voltage source.

4. The combination as defined in claim 1 wherein said means to light and extinguish said light source comprises means to apply a unidirectional voltage across said light source, a control tube in shunt with said light source, and means to control conduction through said light source in response to current flowing in said rectifier system.

5. In a rectifier system of the type wherein a grid controlled gaseous conduction tube is fired by a positive voltage pulse applied to said grid, a light source, means to light and extinguish said light source, a rectifier blocking control system comprising a photoelectric cell directed toward said light source, and means in circuit with said cell to apply a negative voltage of a magnitude smaller than said positive voltage pulse to said grid when said light source is lighted to unblock said rectifier system and to apply a negative voltage of a magnitude greater than said positive voltage pulse to said grid when said light source is extinguished to block said rectifier system.

6. A rectifier system as defined in claim 5 wherein said negative voltage applying means in circuit with said cell comprises a source of unidirectional voltage, a control tube having an anode, a control grid, and a cathode, a load resistor between said voltage source and said anode, a resistor between said control grid and said cathode, and connection means between said anode and the grid of said conduction tube, said cell being connected between said voltage source and the control grid of said control tube.

7. In a rectifier system of the type wherein a plurality of grid controlled gaseous conduction tubes are fired cyclically by positive voltage pulses applied to the grids of said tubes, a light source, means to light and extinguish said light source, a rectifier blocking control system comprising a photoelectric cell directed toward said light source, and means in circuit with said cell to apply a negative voltage of a magnitude smaller than said positive voltage pulses to said grids when said light source is lighted and to apply a negative voltage of a magnitude greater than said positive voltage pulses to said grids when said light source is extinguished, thereby to unblock and block said rectifier system.

8. In a rectifier system of the type comprising a plurality of gaseous conduction tubes each of which has an anode, a cathode, and a grid, a transformer having secondary legs each of which has one end connected to a separate one of said anodes, an impulse transformer having secondary legs each of which has one end connected to a separate one of said grids, and means for applying a load between said cathodes and ground, a light source, means to light and extinguish said light source, a rectifier blocking control system comprising a photoelectric cell, and means in circuit with said cell to unblock and block said rectifier system in response to said means to light and extinguish said light source respectively.

9. A rectifier system of the type defined in claim 8 wherein said means to light and extinguish said light source comprises means to apply a unidirectional voltage across said light source, and switching means in parallel with said voltage source and said light source.

10. A rectifier system of the type described in claim 8 wherein said means to light and extinguish said light source comprises means to apply a unidirectional voltage across said light source, a control tube connected in shunt relationship with said light source, and means responsive to current through said load to control conduction through said control tube, said last-mentioned means comprising a resistor between the other ends of said secondary legs of said transformer and ground.

11. A rectifier system of the type defined in claim 8 wherein said means in circuit with said cell to unblock and block said rectifier system in response to said means to light and extinguish said light source, respectively, comprises an auxiliary unidirectional voltage source having positive and negative output terminals, a voltage divider across said terminals, a control tube having an anode, a cathode, and a control grid, a first resistor connected between said anode of said control tube and a first intermediate point on said voltage divider, a second resistor connected between said cathode and said grid of said control tube, said cathode of said control tube being connected to a second intermediate point on said voltage divider, said cell being connected between the grid of said control tube and said negative terminal, said positive terminal being connected to the cathodes of said gaseous conduction tubes, and said anode of said control tube being connected to the other ends of said secondary legs of said impulse transformer.

References Cited in the file of this patent

UNITED STATES PATENTS

| 2,165,041 | Filberich et al. | July 4, 1939 |
| 2,169,027 | Kilgore | Aug. 8, 1939 |
| 2,217,446 | Ludwig | Oct. 8, 1940 |
| 2,259,295 | Cox et al. | Oct. 14, 1941 |
| 2,673,952 | Hoover | Mar 30, 1954 |